Nov. 2, 1926.

T. MIDGLEY 1,605,454

BAG STRAIGHTENING

Filed Jan. 27, 1926

INVENTOR.
Thomas Midgley
BY
Edward C. Taylor
ATTORNEY.

Patented Nov. 2, 1926.

1,605,454

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BAG STRAIGHTENING.

Application filed January 27, 1926. Serial No. 84,221.

This invention relates to a method and an apparatus for straightening in a tire casing the pressure fluid bags used during vulcanization. In many instances of commercial practice the tires are prepared for vulcanization upon some building form other than the bag. After this form has been removed it is necessary to insert the pressure fluid bag, which is customarily a hollow annulus of rubber somewhat resembling a very thick inner tube, provided with a suitable valve opening. Since the outer diameter of this bag is necessarily larger than the bead diameter of the tire, it is necessary to fold the bag in order to get it into the internal cavity of the tire. When the bag has been inserted these folds must be straightened out. If the folds are not removed uneven stretching of the tire during vulcanization will result. As far as I am aware, such bags have always been straightened by pounding the tire with a heavy mallet, the natural tendency of the bag to assume a truly round form being utilized in the momentary periods of readjustment following the blows of the hammer. This method is, however, crude and will not thoroughly remove kinks from the bag. I have found that greatly improved results, both as to speed of operation and completeness of readjustment, can be attained by subjecting the bag to progressive tension and flexing as set forth in detail below. At the same time I am enabled by my invention to centralize the bag and tire laterally, so that the inner periphery of the bag will be at all places concentric with the bead edges of the casing.

Briefly stated, my improved method consists, in its preferred form (modifications embodying the same principle being, however, covered by the appended claims), in distorting the bag and tire into the general form of an oval or ellipse with the bag under circumferential tension, and in shifting this distortion progressively around the circumference of the bag as many times as may be necessary to accomplish the desired straightening. At the same time the bag may be straightened laterally in the casing by exerting a relative twisting on the bag and tire in the direction necessary while the bag is being progressively distorted as described above.

As an aid to a fuller comprehension of my process, I have illustrated in the accompanying drawings a machine by which my method may be practiced. Referring to these drawings, Fig. 1 is a plan view of a machine constructed in accordance with my invention;

Figure 1:
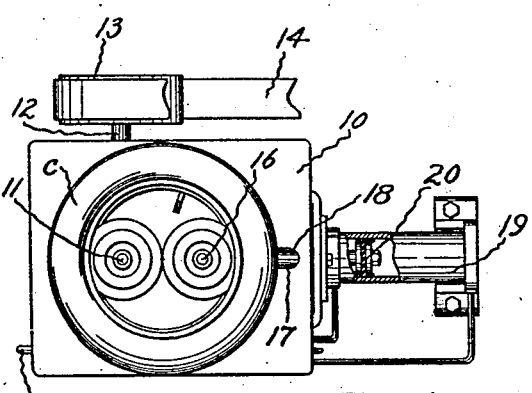

The machine is supported in a base 10, having a vertical shaft 11 journaled in fixed position therein. A horizontal shaft 12, provided with a pulley 13 whereby it may be rotated by a belt 14, is geared to the shaft 11 at 15. A second vertical shaft 16 is guided towards and away from shaft 11 through a slot 17 in the top of the base. The piston rod 18 of a pneumatic cylinder 19, the piston of which is shown at 20 in Fig. 1, is connected to the vertical shaft 16 at 21. By suitable air connections, controlled by a valve 22 having an operating handle 23, air may be admitted to one end or the other of the air cylinder, and the shaft 16 moved towards or away from the shaft 11.

Figure 4:
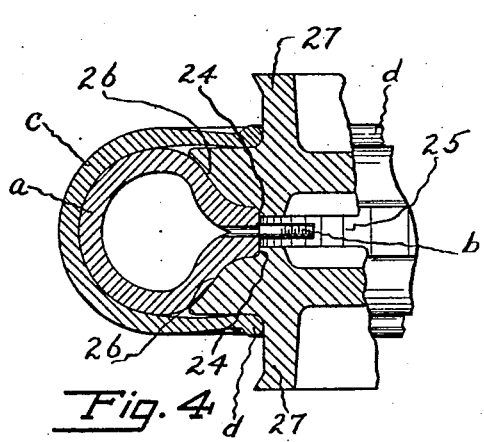
Fig. 4 is an enlarged section of the means for holding the bag and tire.

Each of the vertical shafts carries a device for supporting the air bag and tire casing. These two devices are similar, and a description of one will suffice. Each device comprises a pair of roller shaped members, the pair on shaft 11 being fixed to the shaft while those on shaft 16 are free to rotate. Each of the rollers is provided with several operating surfaces. At the center of each device is a shouldered portion 24 (Fig. 4) which supports the inner periphery of the air bag $a$. The two rollers are spaced somewhat, as at 25, to afford space for the valve stem $b$ with which the bag is fitted. Instead of making the rollers in separated pairs for this purpose, they may, of course, be formed integrally with a deep groove accomplishing the same purpose.

Adjoining the shouldered portions 24 are outwardly extending flanges 26 extending between the bag and the tire and preferably shaped to fit the contour of the side of the bag so as to give it additional centralizing support and separate it somewhat from the inner wall of the tire casing c. Adjoining the flanges 26 are substantially cylindrical portions 27 of a size adapted to fit within the beads d of the casing, and to cause a lateral adjustment of the casing on the bag if these are not accurately registered. Preferably the diameter of portions 27 are so chosen that, when the sets of rollers on the two vertical shafts are separated by the air cylinder, the beads of the casing will not be subjected to as high a degree of tension as the inner periphery of the bag, or even will be subjected to no tension when the bag and tire are properly centralized.

Figure 2:
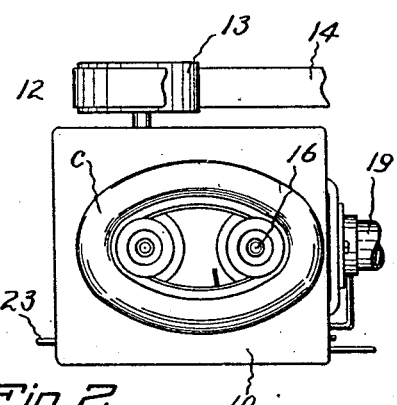
Fig. 2 is a similar view showing the parts in another position.
Figure 3:
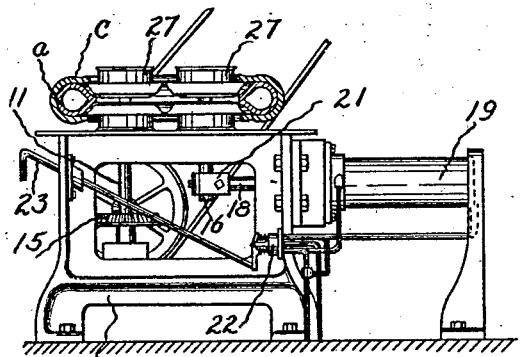
Fig. 3 is a side elevation of the machine.
Figure 5:
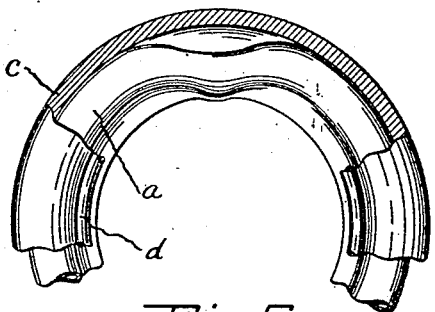
Fig. 5 is a detail, partly broken away, showing the condition of the air bag in the tire before readjustment.
Figure 6:
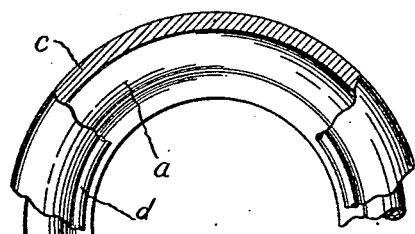
Fig. 6 is a similar view showing the bag in its readjusted condition.

The operation of the device is as follows: With the parts in the position of Fig. 1, that is to say with the shaft 16 moved towards shaft 11 by the action of the air cylinder, the bag and tire are placed over the two sets of rollers. The rollers on shaft 11 are in constant rotation due to the operation of belt 14, but as no tension is as yet imparted to the bag no rotation is given to it. The next operation is the separation of the shafts 11 and 16 by the air cylinder, this action being controlled by actuation of the valve handle 23. The flanges 26 are during this motion forced between the bag and the casing, the operator guiding the assembly into place if necessary until finally the shoulder 25 tensions the inner periphery of the bag and distorts the bag and tire into the elliptical shape shown in Fig. 2. Rotation is now being imparted to the bag and tire by the driven rollers on shaft 11, and they are allowed to travel around the rollers as many times as necessary to straighten out any kinks (shown at 28 in Fig. 5) and cause the bag to lie smoothly as in Fig. 6.

Having thus described my invention, I claim:

1. A method of straightening a fluid pressure bag in a tire casing which comprises causing slight relative movement between the bag and the casing at points shifting progressively around the circumference of the casing.

2. A method of straightening a fluid pressure bag in a tire casing which comprises flexing the bag and tire progressively around their circumference.

3. A method of straightening a fluid pressure bag in a tire casing which comprises stretching the inner periphery of the bag at points shifting progressively around its circumference.

4. A method of straightening a fluid pressure bag in a tire casing which comprises separating the side portions of the bag and casing and simultaneously stretching the inner periphery of the bag, said separating and stretching actions being shifted progressively around the circumference.

5. A method of straightening a fluid pressure bag in a tire casing which comprises supporting the inner periphery of the bag under circumferential tension, and flexing the bag and casing into a curvature of less than normal radius at points shifting progressively circumferentially around the casing.

6. A method of straightening a fluid pressure bag which comprises flexing the bag and casing into a curvature of less than normal radius at points shifting progressively circumferentially around the casing.

7. A method of straightening a fluid pressure bag which comprises flexing the bag and casing into a curvature of less than normal radius at points shifting progressively circumferentially around the casing, and simultaneously twisting the bag and casing relative to each other to centralize them laterally.

8. A machine for straightening fluid pressure bags in tire casings which comprises a moving surface adapted to support the inner periphery of a bag under circumferential tension, said surface defining a curve of less than the normal radius of the bag.

9. A machine for straightening fluid pressure bags in tire casings which comprises means for supporting the inner periphery of a bag under circumferential tension, and means for supporting the bead edges of the casing in lateral alignment with the bag but without substantial circumferential tension.

10. A machine for straightening fluid pressure bags in tire casings, which comprises a pair of rollers adapted to support the inner periphery of the bag, said rollers having a central groove to permit the passage of the bag valve stem, flanges on the rollers adapted to enter between the bag and tire, surfaces on the rollers adapted to support the bead edges of the tire, means for separating the rollers, and means for rotating the rollers.

11. A machine for straightening fluid pressure bags in tire casings, which comprises a pair of rollers adapted to support the inner periphery of a bag, and means for rotating the rollers.

12. A machine for straightening fluid pressure bags in tire casings, which comprises a pair of rollers adapted to support the inner periphery of a bag, means for separating the rollers, and means for rotating the rollers.

13. A machine for straightening fluid pressure bags in tire casings which comprises means for stretching the bag and casing, means for separating the sides of the casing from the bag, and means for shifting the action of the stretching and separating means progressively around the circumference of the casing.

14. A machine for straightening fluid pressure bags in tire casings which comprises a pair of rollers adapted to support the inner periphery of the bag, flanges on the rollers adapted to extend between the side of the bag and the casing, and means to rotate the rollers.

15. A machine for straightening fluid pressure bags in tire casings which comprises a pair of rollers adapted to support the inner periphery of the bag, means for separating the rollers to exert tension on the bag, and other surfaces adapted to guide the bead edges of the casing without substantial tension.

16. A machine for straightening fluid pressure bags in tire casings which comprises means for supporting the inner periphery of the bag under circumferential tension with at least one section distorted into a curvature of less than normal radius, and means for causing the successive portions of the bag to assume said distorted curvature.

17. A machine for straightening fluid pressure bags in tire casings which comprises means for supporting the inner periphery of the bag under circumferential tension with at least one section distorted into a curvature of less than normal radius, means for supporting the bead edges of the casing in lateral alignment with the bag but without substantial circumferential tension, and means for causing successive portions of the bag and casing to assume said distorted curvature.

THOMAS MIDGLEY.